United States Patent [19]
Manduley

[11] Patent Number: 5,956,505
[45] Date of Patent: Sep. 21, 1999

[54] REMOTE ACTIVATION OF SOFTWARE FEATURES IN A DATA PROCESSING DEVICE

[75] Inventor: Flavio M. Manduley, Woodbury, Conn.

[73] Assignee: Pitney Bowes Inc., Stamford, Conn.

[21] Appl. No.: 07/813,080

[22] Filed: Dec. 24, 1991

[51] Int. Cl.[6] .................................................. G06F 15/177
[52] U.S. Cl. .......................... 395/651; 395/712; 705/410; 705/416
[58] Field of Search ..................................... 395/200, 325, 395/600, 650, 725, 575, 700; 380/4

[56] References Cited

U.S. PATENT DOCUMENTS

| | | | |
|---|---|---|---|
| 3,792,446 | 2/1974 | McFiggins et al. | 395/200 |
| 4,097,923 | 6/1978 | Eckert, Jr. et al. | 395/200 |
| 4,652,990 | 3/1987 | Pailen et al. | 380/4 |
| 4,685,055 | 8/1987 | Thomas | 380/4 |
| 4,740,890 | 4/1988 | William | 395/575 |
| 4,780,821 | 10/1988 | Crossley | 395/650 |
| 4,791,565 | 12/1988 | Dunham et al. | 395/575 |
| 4,937,863 | 6/1990 | Robert et al. | 380/4 |
| 4,941,175 | 7/1990 | Enescu et al. | 380/4 |
| 5,103,476 | 4/1992 | Waite et al. | 380/4 |
| 5,107,455 | 4/1992 | Haines et al. | 395/275 |
| 5,113,222 | 5/1992 | Wilson et al. | 364/146 |
| 5,155,847 | 10/1992 | Kirouac et al. | 395/600 |
| 5,287,505 | 2/1994 | Calvert et al. | 395/600 |

*Primary Examiner*—Thomas G. Black
*Assistant Examiner*—John Loomis
*Attorney, Agent, or Firm*—Melvin J. Scolnick; Robert H. Whisker; David E. Pitchenik

[57] ABSTRACT

A method is provided for activating an optional feature in a data processing device that includes a microprocessor and memory. The method includes storing in the memory: a number of applications programs, at least one of which has at least one optional feature; application manager software for controlling access to the application programs; a communications software module, accessed by means of the application manager, for controlling data communication by the device; and a program activation software module, accessed by means of the application manager and including activation data that indicates whether each optional feature is activated or unactivated. The method also includes receiving a request to operate one of the optional features, determining by reference to the activation data whether the feature is activated or unactivated, operating the feature if it is activated and otherwise preventing operation of the feature. The method further includes receiving a request to activate the feature (if unactivated) and updating the activation data to indicate that the feature has been activated.

13 Claims, 9 Drawing Sheets

REMOTE ACTIVATION OF SOFTWARE FEATURES IN A DATA PROCESSING DEVICE

RELATED APPLICATIONS

Reference is made to application Ser. No. 07/812,983, now abandoned, and copending application Ser. No. 07/812,982, filed contemporaneously herewith and assigned to the assignee of this application.

FIELD OF THE INVENTION

This application relates to operation of data processing devices and more particularly to such devices that perform a plurality of functions under the control of a stored software program.

BACKGROUND OF THE INVENTION

With the proliferation of microprocessor-based data processing devices, there have developed large industries devoted to marketing and distribution of computer software, i.e. programs to control the operation of devices, and data to be processed by the devices. The software is often complex and is capable in some cases of performing a large number of different functions. Processable data may also be provided in different varieties that are useful for a number of different purposes or tasks. It is also becoming common for the price of software or data to be based on the "value" to the customer. Thus, the marketer may wish to charge the customer a separate amount for each software function or each variety of data and the customer may wish to pick and choose among the functions and/or varieties. This may be the case whether the software or data is sold by itself or together with a data processing device.

A type of data processing device that illustrates the foregoing is the computerized parcel manifest system, of which well known examples are the STAR 200 and the STAR 110, both marketed by Pitney Bowes Inc., Stamford, Conn. These devices are both sold with operating system software, application software that controls the devices so as to perform their intended functions, and data to be used by the device. The data includes carrier rate data that is used for calculating parcel shipping charges. The STAR 200 includes an IBM PC-compatible microcomputer interfaced to an electronic scale. Also included in the STAR 200 is a customized keyboard that includes special keys for selecting a parcel carrier or class of service. Software and data are loaded into the computer for storage on a hard disk.

The STAR 110 resembles a conventional electronic scale in outward appearance. A microprocessor, memory, weighing scale hardware and software, and a keyboard and small display, are all integrated into a single housing. Part of the device's memory is a ROM which stores the operating system and application software. Thus the software is "embedded" in the device, which is sometimes referred to as an "embedded system." Carrier rate data and other information are stored on PROMs that are detachably connected to the device and are addressable by the microprocessor.

Both the STAR 110 and STAR 200 are capable of performing a number of accounting functions and producing printed shipment manifests, shipping forms and labels, and a number of different reports by means of a peripheral printer or printers. Both also permit processing of parcels in accordance with the requirements of several carriers. In addition to rate data that is provided as a standard feature of these devices, other rate data packages (e.g. for additional carriers or classes of service) are available for an additional fee. Since not all customers desire to purchase any or all of the available optional rate packages, the supplier of the devices must arrange that a variety of sets of rate data packages be stored in the devices. For example, it has been known to install PROMs in the device (if the device is an embedded system) or to supply a floppy disk (if the device is PC-based), containing only the rate packages desired by the customer. However, such arrangements may require production and storage of a large number of different rate PROMs and disks, with attendant expense and inconvenience. It has also been known to store some or all of the possible rate packages on a standard PROM or disk or set of PROMs or disks and then to control the device's access to the rate data via "directory" information stored on a directory PROM or disk. This approach also entails significant expense and inconvenience. Under both approaches, the inconvenience can be increased when the customer wishes to add an optional rate package at some point after initial purchase of the device. A significant part of the inconvenience arises from the need to keep track of which customers are holding which optional rates, for purposes of distributing rate updates.

Thus a more convenient and less expensive method of distributing rate or other types of optional data packages is desirable. It is also desirable to facilitate the distribution of applications software having optional features for which separate amounts may be charged.

SUMMARY OF THE INVENTION

According to the invention, a method is provided for activating an optional feature in a data processing device that has a microprocessor and a memory connected to the microprocessor. The method includes:

(a) storing in the memory a number of applications programs, the programs being for controlling the microprocessor to carry out intended functions of the device, at least one of the applications programs including at least one optional feature;

(b) storing in the memory application manager software for controlling access to the stored applications programs;

(c) storing in the memory a communications software module that includes a number of communication protocol submodules, the submodules being for controlling the device for data communication with other processing systems; the communications software being accessed by means of the application manager;

(d) storing in the memory a program activation software module, which is accessed by the application manager and includes activation data that indicates for each optional feature whether the feature is activated or unactivated;

(e) receiving a request to operate one of the optional features;

(f) determining by reference to the activation data whether the requested feature is activated or unactivated;

(g) operating the requested feature if the requested feature was determined to be activated; and (h) preventing operation of the request feature if the feature was determined to be unactivated.

According to another aspect of the invention, the method also includes receiving an activation request to activate the feature if the feature was determined to be unactivated, and, in response to the activation request, updating the activation data to indicate that the feature has been activated.

According to a further aspect of the invention, the method also includes generating an activation request code in response to receipt of the activation request, the code including information that identifies the device and the feature; transmitting the activation request code to a data center; receiving an activation code from the data center in response to the transmitting of the activation request code; and entering the activation code into the device, the updating being in response to entering the activation code; whereby activation of the feature occurs under control of the data center.

BRIEF DESCRIPTION OF THE DRAWINGS

FIGS. 3-A, 3-B, 3-C, and 3-D are a flow chart of a routine for activating an optional program feature in the device of FIG. 1.

FIGS. 4-A and 4-B are a flow chart of a routine by which a data center receives a feature activation request and issues a feature activation code.

DETAILED DESCRIPTION OF THE INVENTION

Figure 1:
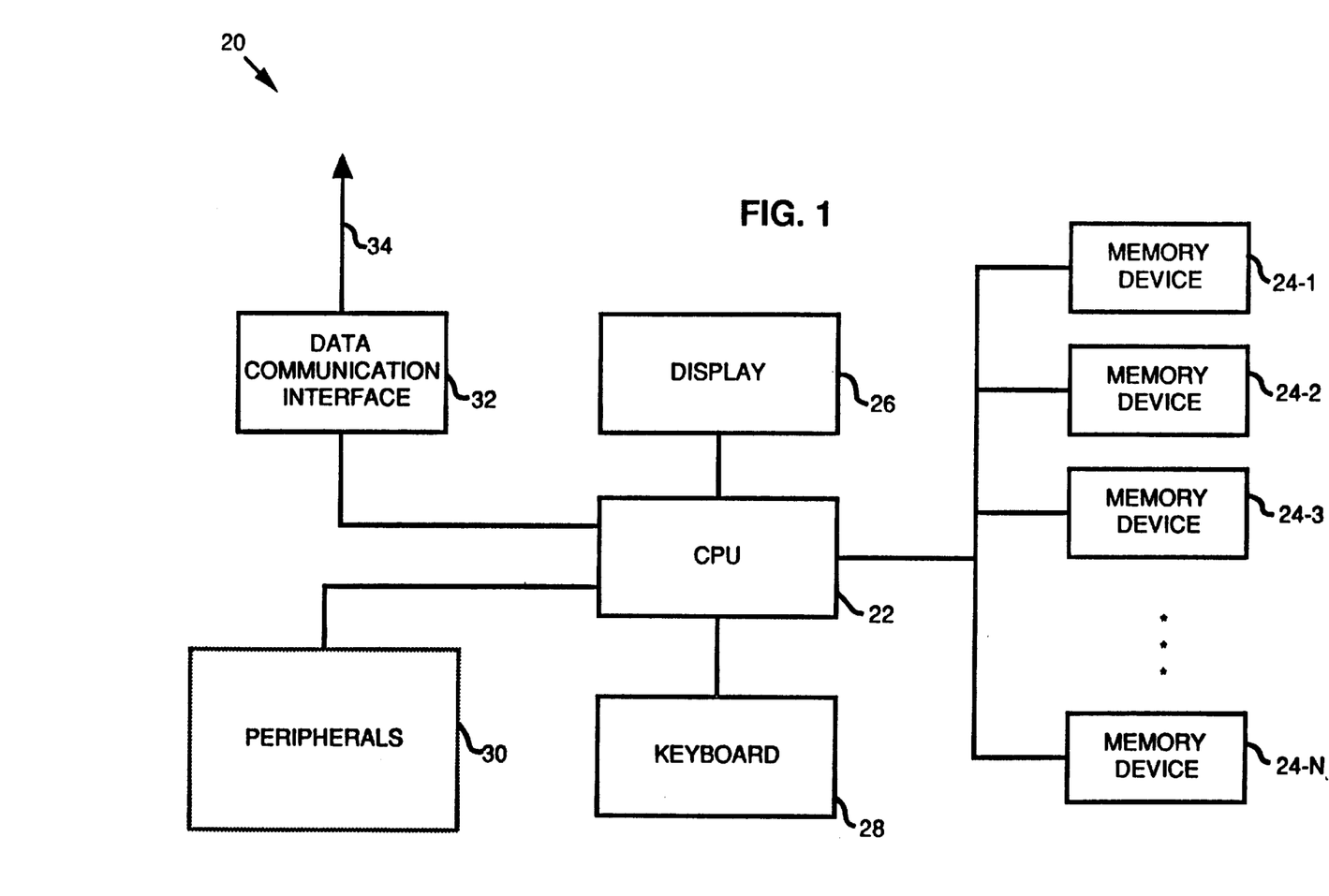
FIG. 1 is a block diagram of a data processing device with which the inventive method may be used.

FIG. 1 illustrates in block diagram form a data processing device 20 with which the inventive method may be used. Device 20 includes CPU 22, which may be a conventional microprocessor. Connected to CPU 22 are a plurality of memory devices 24-1 through 24-N. Memory devices 24 may include, for example, program memory ROMs, detachable PROM paddles, working RAMs, fixed and/or floppy disk drives, CD ROM drives, etc. It will be appreciated that at least some of memory devices are read/write memory while others may be read only.

Also connected to CPU 22 is a display 26 and a keyboard 28. There may be associated with keyboard 28 a conventional mouse (not shown).

Among other alternatives, the hardware just described may advantageously be realized in a conventional personal computer, or may be incorporated in an embedded system such as the STAR 110 described above.

Device 20 also includes one or more peripherals, represented by block 30, which are connected to CPU 22 and which may include an electronic scale, a postage meter and/or one or more printers. Also connected to CPU 22 is a data communication interface 32, which may be a conventional modem, and which is capable of establishing a data communication path (represented by arrow 34) between device 20 and another data processing system (not shown).

Figure 2:
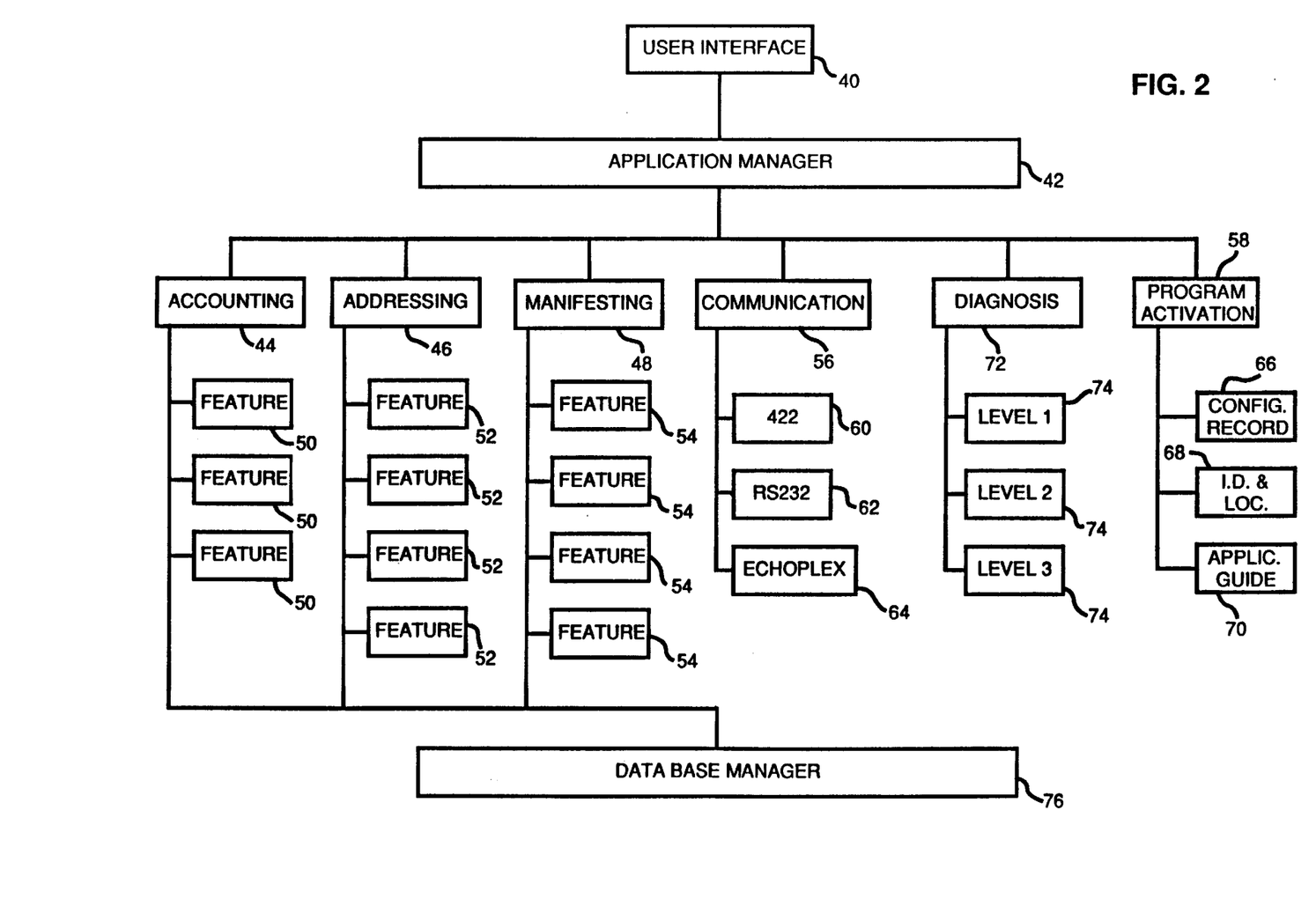
FIG. 2 is a diagram of the software architecture for a program that controls the device of FIG. 1.

FIG. 2 is a schematic illustration of the architecture of application program software stored in one or more of memory devices 24. Block 40 represents user interface software that allows the user to input data into, and control, device 20 and to receive information from device 20. The user interface software also allows the user to access application manager software (block 42), which, as described below, enables and controls access to the various applications resident in device 20.

Accessed via application manager 42 are one or more application programs, such as an accounting program (block 44), an addressing program (block 46), and a manifesting program (block 48). It is within the contemplation of the invention that one or more of the applications may comprise an expert system. Accounting program 44 preferably comprises the functionality of a device such as The Mail Management System available from Pitney Bowes Inc., Stamford, Conn. As will be appreciated by those skilled in the art, accounting program 44 contains capabilities for keeping track of, and generating reports concerning, mailroom activities and expenses. Accounting program 44 is preferably divided into a plurality of features 50, each of which represents one or more record-keeping and/or report-generating functions. For example, a first one of features 50 may consist of capabilities for generating reports of activity and expenses on a department-by-department basis. A second of features 50 may consist of a capability for generating a report that analyzes actual performance vs. budgeted performance. A third feature 50 may consist of capabilities for generating reports that are broken down by class of mail.

Addressing program 46 preferably includes the functionality of the AddressRight system available from Pitney Bowes Inc. Thus addressing program 46 preferably includes a plurality of features 52 such as mailing list correction, duplicate address elimination, merging of two or more mailing lists, envelope printing or barcode generation.

Manifesting program 48 preferably includes the functionality of the aforesaid STAR 200 parcel manifest system. The features 54 making up manifesting program 48 may therefore include a plurality of carriers or classes of service for which manifests can be produced and a plurality of accounting and reporting capabilities concerning manifesting activities performed by manifesting program 48.

Application manager 42 also provides access to communications software module 56 and program activation module 58. Communications module 56 is made up of submodules that enable device 20 to utilize such well-known communication protocols as 422 (block 60), RS232 (block 62) and Echoplex (block 64). Program activation module 58 includes a portion referred to as the "configuration record" (block 66) which is for storing data concerning the activated and activatable software options for device 20 and also the hardware configuration of device 20. Another portion of program activation module 58, represented by block 68, contains data identifying device 20 and its location. This data may include, for example, a device serial number for device 20 and the zip code of device 20's location. A third portion, represented by block 70, contains software that monitors operation of device 20 and makes suggestions to the user concerning unactivated programs or features that may be of value to the user. Portion 70, sometimes referred to as the "application guide", will be discussed in more detail below.

Also accessible via application manager 42 is a diagnostic software module 72 which includes self-diagnosis software routines that may be initiated by keyboard input. As illustrated in FIG. 2, module 72 includes three diagnostic levels 74, that might respectively be accessible by an authorized user, a supervisory user and a service representative. A greater or smaller number of levels is also contemplated.

Completing the software architecture of device 20, as portrayed in FIG. 2, is a data base manager program, represented by block 76. Database manager 76 may be one of a number of commercially available database management packages and is accessed by accounting program 44, addressing program 46 and manifesting program 48 for the purpose of performing some of their functions, such as storing transaction data, generating reports, or accessing an address data base.

Figure 3:
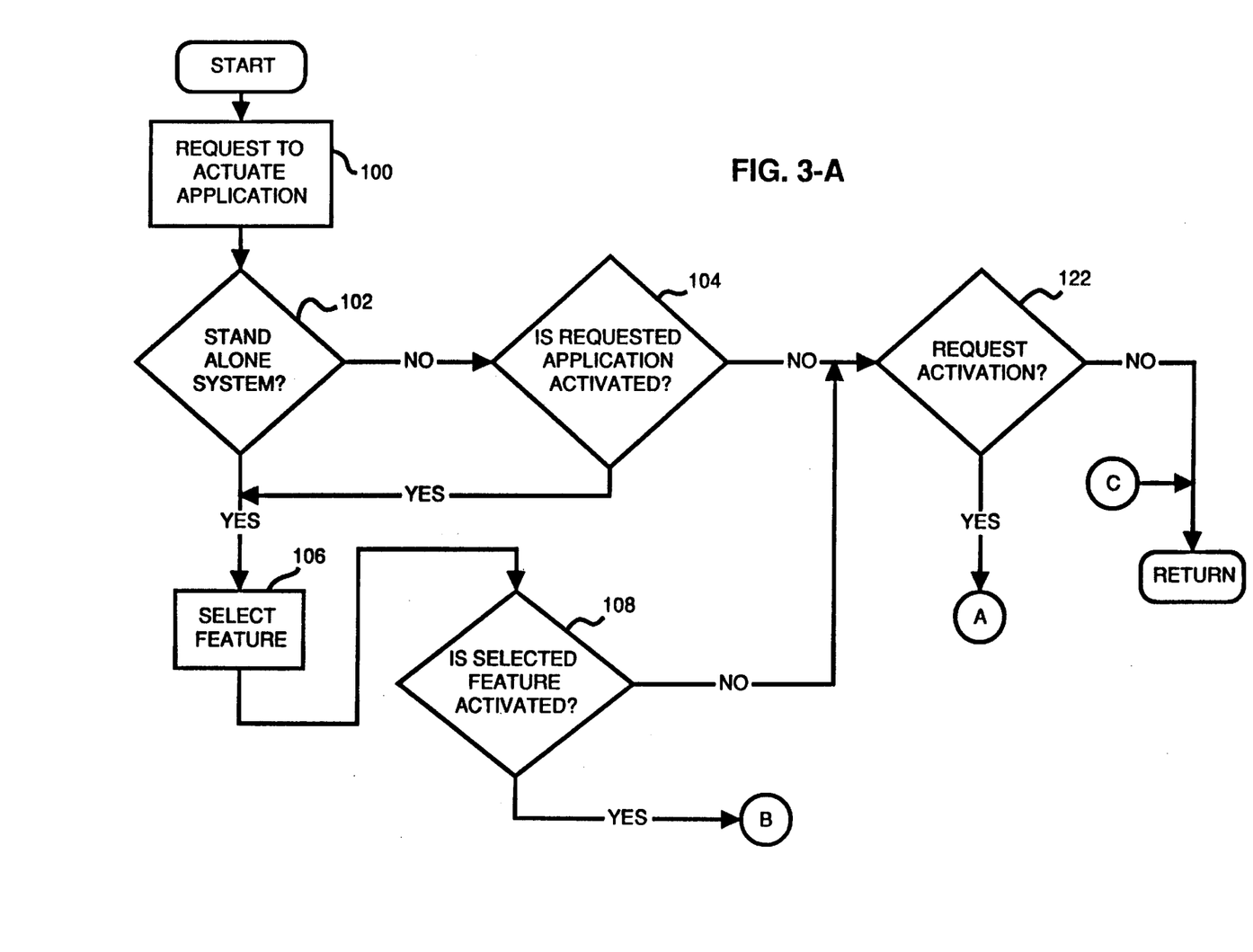

FIGS. 3-A, 3-B, 3-C and 3-D are a flow chart of a routine by which application manager 42 and program activation module 58 control access to, and activation of, the application programs and their various features.

The routine commences with step 100, at which the user requests that an application be actuated. The request may be made by entry of appropriate data or selection of a menu item through keyboard 28. The request is presented to application manager 42 through user interface software 40.

Application manager 42 then determines, at step 102, whether device 20 is a stand alone system, i.e. whether device 20 includes only one application program such as accounting program 44. If at step 102 it was determined that device 20 is a stand alone system, the routine proceeds directly to step 106. If device 20 is not a stand alone system, then it is determined whether the requested application has been activated (step 104). This is accomplished through program activation module 58 which consults a part of configuration record 66 which is referred to as the "activation map". The activation map contains data indicating which application programs, and which features of the programs, have been activated and whether the activation is permanent or temporary.

If at step 104 it was determined that the requested application was activated, the user is permitted to select a feature of the requested application (step 106). It is then determined, again by reference to the activation map, whether the selected feature has been activated (step 108).

If at step 108 the selected feature was determined to have been activated, it is next determined whether the activation was temporary, again by reference to the activation map (step 110, FIG. 3-B). If at step 110 the activation is not found to be temporary (i.e., the activation is permanent), application manager 42 proceeds to permit operation of the requested feature (step 112). For example, if the requested application was accounting program 44, and if the requested feature was a department-by-department report generation package, the requested report would be generated at step 112. Preferably the operation of device 20's hardware is sufficiently rapid that steps 102 through 110 are accomplished without a delay that is perceptible to the user.

Returning now to step 110, if activation of the requested feature was found to be temporary, program activation module 58 updates a usage counter with respect to the requested feature to account for the requested use of the feature (step 114). Program activation module then compares the updated usage counter with the amount of usage allowed, as stored in the activation map (step 116). It is next determined, at step 118, whether the allowed usage will be exhausted by the request to operate the feature. If not, the routine simply proceeds to step 112, at which the feature is operated as mentioned above. Otherwise, the routine proceeds to step 120, at which the activation map is altered to indicate that the requested feature is no longer activated. The routine then proceeds to step 112, which will be the last operation of the requested feature, unless that feature is reactivated on the activation map, as will be described below.

Upon completion of step 112, the routine ends.

If the requested application was found at step 104 not to be activated, or if at step 108 the selected feature was found not to be activated, the user is so advised and it is next determined whether the user requests activation of the application or feature (step 122, FIG. 3-A). If not, the routine ends. If activation is requested, the routine proceeds to step 124 (FIG. 3-C) at which it is determined whether the user is authorized to request activation. As will be well understood by those skilled in the art, device 20 may be arranged so that various levels of authority will be granted to various users, under the control of appropriate passwords. Thus a supervisor or a manager level of authorization may be required to request activation of an application or a feature. If at step 124 the user was found not to be authorized, the routine ends. Otherwise, the user is prompted to select the program or feature that is to be activated (step 126). It will be appreciated that selection of features to be activated may conveniently be guided by menus displayed on display 26 and selection may be implemented by the user via keyboard 28. With respect to at least some of the features available for activation, there may be menu items that indicate that either temporary or permanent activation is available. If the user selects temporary activation, there may be menu items that indicate such options as the number of times the feature will be made available for use, or a length of time during which the feature will be available. After step 126, program activation module 58 then proceeds to generate a code that represents the applications or features or both for which activation is requested (step 128). It will be understood that, if temporary activation has been selected for some of the features, the activation map will reflect that fact and also will reflect the durations or amounts of usage selected for those features. Module 58 then proceeds to step 130, at which it is determined whether all hardware required for the requested application or feature is connected to or included in device 20. For example, if the requested feature was the envelope printing feature of addressing program 46, program activation module 58 refers to the configuration record to determined whether an envelope printer is one of peripherals 30.

If at step 130 it was determined that hardware not part of or connected to device 20 is required for the requested feature or application, program activation module 58 then generates a code that represents an order for the necessary hardware (step 132). Following step 132 (or step 130 if all necessary hardware was found to be in place) is step 134, at which either the user enters data identifying device 20, or module 58 accesses such data from portion 68. The accessed or entered data may include zip code or other data identifying the location of device 20.

Following step 134 is step 136 at which program activation module 58 generates an integrated request code that reflects the entered I.D. and location data, the software activation request and any hardware that is to be ordered. It will be understood that step 136 may include use of an encryption algorithm.

Following step 136 is step 138 (FIG. 3-D) at which it is determined whether device 20 is arranged for direct data communications with the data center. If not, step 140 follows, at which device 20 displays to the user instructions for calling a data center. After step 140 is step 142 at which system 20 displays a list of the features and/or applications requested for activation by the user. That list also preferably includes all the hardware which is being ordered because it is required for operation of the requested features or applications. After step 142 is step 144 at which device 20 displays the integrated request code that was generated at step 136. It will now be assumed that the user enters into communication with a data center in a manner that will be described below. It will further be assumed that, as a result of that communication, the user has received from the data center an activation code. Thus at step 146, the user enters into device 20, via keyboard 28, the activation code received from the data center. The entered code is decrypted by program activation module 58, which then updates the activation map of configuration record 66 to reflect activation of the programs and or features for which activation was requested (step 148). With respect to features for which temporary activation was requested, updating of the activation map includes storage of data that indicates the selected amount or duration of usage of the feature. A selected duration may be stored in the form of a deadline; a selected amount may be stored in the form of a number of times that the feature may be selected for use. It will be appreciated that temporary activation allows a user to have use of a feature on a rental or free trial basis.

After step 148, the routine then ends. It will be understood that the user is now free to request operation of the activated programs or features and that such a request will lead to step 112, as discussed above.

Returning now to step 138, if device 20 was equipped for direct communication with the data center, step 150 will follow step 138. At step 150 appropriate action is taken through communication module 56 to establish a direct data link with a data center. Communication via conventional telephone, or alternatively cellular telephone or other wireless communication is contemplated. Following step 150 is step 152, at which the integrated request code is transmitted from device 20 to the data center. An activation code is then received by device 20 from the data center. Step 152 then leads to step 148, as described above.

The data center to which request codes are to be sent and from which activation codes are received is preferably of the same general type as the data center described in U.S. Pat. Nos. 3,792,446 and 4,097,923 in connection with a system for remotely charging postage meters. The disclosures of those patents are incorporated herein by reference. In addition to receiving numeric input from a user's telephone tone pad and providing information via a voice answer back unit, the data center is advantageously also adapted to enter into direct data communication with a device 20.

Figure 4:
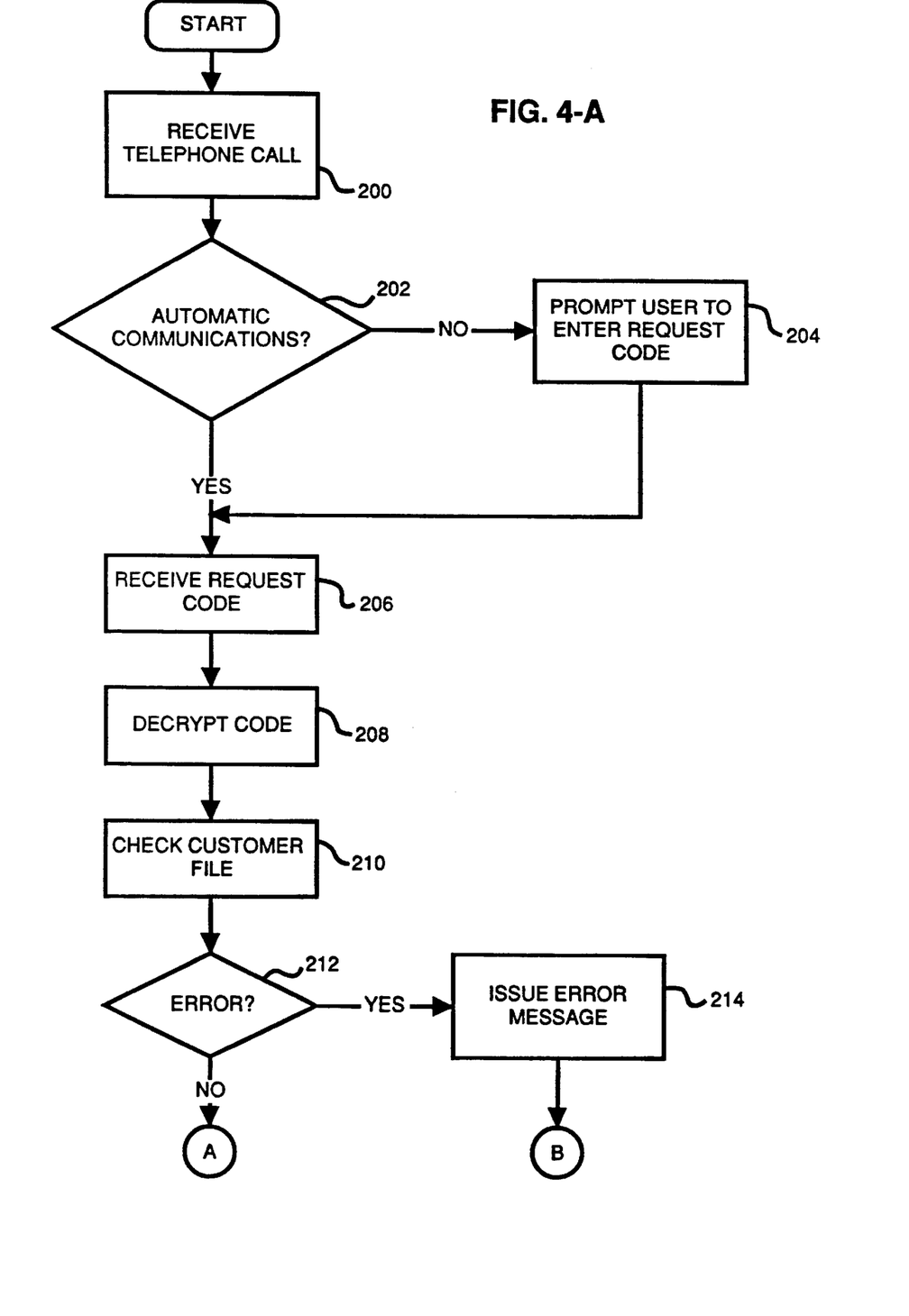

FIGS. 4-A and 4-B illustrate a software routine for controlling a data center to receive request codes from users or devices 20 and to transmit activation codes to users or devices 20. Such a data center may be maintained, for example, by a company that manufactures or markets devices 20.

The routine begins with step 200, at which the data center receives a telephone call. The routine then proceeds to step 202, at which it is determined whether there is to be direct communication between the data center and a device 20. For example, the data center may determine whether a predetermined code has been transmitted, presumably by a device 20, indicating that automatic communications are to proceed. If at step 202 it is determined that direct communication will not be used, is data center will then prompt the user, by means of a voice answer back unit, to enter a request code (step 204). Either following step 204, or directly after step 202 if direct communications or to be used, is step 206, at which the data center receives the request code which, it will be understood, is either entered via a telephone tone pad by the user or is transmitted automatically by a device 20. Following step 206 is step 208, at which the data center decrypts the received request code in order to determined what programs or features are requested to be activated. It will be recalled that the request code also contains information identifying the device 20 for or by which the request is being made. From that information, the data center determines the identity of the customer holding that device 20 and checks the customer's file to determine whether the request is appropriate (step 210). For example, the data center checks to see whether the request code included a request to activate a feature or program that, according to the customer's file, was already activated.

Following step 210 is step 212, at which it is determined whether an error is found by reference to the customer's file or in decrypting the request code. If so, step 214 follows, at which the data center issues an error message (either by direct communication to device 20 or to the user via the voice answer back unit, as the case may be) and the routine ends. Otherwise, step 216 follows step 212. At step 216 the data center determines whether the request code included a request to order hardware. If so, the routine proceeds to step 218, at which the data center issues instructions that will result in a shipment to the user of the ordered hardware.

Step 220 then follows step 218 (or directly follows step 216 if no hardware was ordered). At step 220 the data center updates the customer's file to reflect activation of the requested programs or features and addition of any ordered hardware. Step 220, where appropriate, also includes updating of any applicable maintenance agreement or product leasing arrangement. The routine then proceeds to step 222, at which the data center issues instructions that will result in billing the holder of device 20 for any charges applicable to the requested programs or features and any ordered hardware, with updated or supplementary billing of maintenance and/or lease payments. Next, step 224 follows step 222. At step 224 the data center generates a code that, when entered into device 20, will cause device 20 to update its activation map to activate the requested application or features. The code will include data necessary to cause the activation map to reflect an amount usage limitation or deadline in the case of features for which temporary activation is requested.

After the activation code is generated, it is encrypted (step 225).

Following step 225 is step 226, where the routine branches depending on whether or not direct communication with device 20 is being used. If so, the code is directly transmitted via the data communication link (step 28). If not, the code is transmitted to the user via the voice answer back unit, for entry by the user via keyboard 28 (step 230). In either case, it will be appreciated that steps 146 and 148 of FIG. 3-D may now be accomplished.

It is also contemplated that step 148 may include generation by device 20 of a confirmation code to confirm proper activation of the requested features. This code is to be transmitted to the data center to assure accuracy of the data center's customer files.

It is now appropriate to make three additional points concerning temporary activation.

First, although the above description has referred to temporary activation of features but not of application programs, it is also within the contemplation of the inventive method to permit temporary activation of application programs instead of, or in conjunction with, temporary activation of features of application programs. Based on the above description, it would be well within the abilities of those skilled in the art to implement the inventive method with temporary activation of application programs.

Second, temporary activation has, for the most part, been described on the assumption that the amount of permitted usage of the feature is based on a quantity of usage. For example, the usage could be measured in terms of number of transactions processed, or dollar-amount of shipping charges calculated, number of sessions, total duration of sessions, number of users, total distances of goods shipped, total weight of goods shipped, number of reports printed or any other measurable quantity related to the operation of device 20. It is also contemplated that the temporary activation could be for a fixed time period, i.e. expiring at a fixed deadline. In that case device 20 preferably includes a clock/calendar mechanism for indicating the current date and time; preferably, the activation map is automatically updated to end the temporary activation when the deadline passes.

Third, it may be desirable to warn the user if the permitted duration or quantity of usage will soon expire or be exhausted. Accordingly, step 116 of FIG. 3-B may include a test as to whether such a warning is appropriate. If so, a warning such as the following is to be displayed on display 26:

"The [feature selected] has been temporarily activated. Please note that only X more uses of this feature are authorized under the temporary activation."

The warning may then go on to advise the user how permanent or further temporary activation may be requested. Of course, in the case of a limited duration temporary activation, the warning would refer to the approaching deadline rather than the number of remaining authorized uses.

Reference has been made to encryption and decryption of request codes and activation codes. Software required to perform such encryption and decryption is well known to those skilled in the art and need not be described herein for a complete understanding of the invention.

Use of the inventive method in connection with manifesting application program 48, will now be discussed in more detail. In particular, there will be described a convenient method of distributing and providing access to carrier rate data.

As is well known to those skilled in the art, manifesting systems are often capable of calculating the cost of shipping a parcel via a number of classes of service of a number of carriers. The process of calculating that cost is commonly referred to as "rate calculation" or "rating". It is frequently the case that a different rate table is required for each class of service of each carrier. The data representing those tables is usually called "rate data" and is stored in the memory of the system. In the case of device 20, rate data for a number of classes of service is preferably stored in one or more of memory devices 24, the rate data being accessible by CPU 22 for the purpose of rate calculation. Advantageously, all rate data necessary for all rating operations to be performed by device 20 is to be stored.

A company that markets device 20 may elect to offer a basic group of rating capabilities to be included in the price of device 20 and also a number of optional groups of rating capabilities, comprising the balance of device 20's rating capabilities. It will be understood that an additional price would be charged for each optional group. Access to the rate tables may be controlled by program activation module 58 and the activation map previously described, in the same manner that access to other software features is controlled.

In another approach to remote activation of rate data packages, there are stored in one or more memory devices 24, for a given class of parcel carriage service, a number of different alternative rate tables, representing, perhaps, different discount levels made available by the carrier. A customer who qualifies for a certain discount level may obtain a code (perhaps from the carrier), which when input into device 20, causes the activation map to be updated to implement that discount level for that class of service. Temporary activation of a discount or other rate table, in the same manner as temporary activation of a application program or feature, is also contemplated. Activation for a short period, such as one day, is contemplated. In this manner, carriers would be able to provide promotional discounts for short periods of time.

In a similar approach to carrier rate changes, a number of alternative rate tables, representing alternative new rate schemes contemplated by the carrier, are stored in one or more memory devices 20 in advance of an anticipated rate change. Just prior to the effective date of the new rate scheme, an appropriate code is transmitted to the user (or directly to device 20) by mail, telephone or other means. Upon inputting or transmission of the code into device 20, the activation map is updated so that the appropriate one of the alternate rate tables will be used in rating calculations. Such an approach greatly reduces the administrative and logistic burden of distributing rate PROMs shortly before rate changes occur.

It should be noted that since rate package activation is controlled through the data center, the operator of the data center can readily maintain a complete record of what rate tables are being used by which customers. Rate updating is thereby greatly facilitated.

Reference was previously made to automatic ordering of additional hardware when needed to implement a feature or application for which activation was requested. It will be understood that there may be some delay in delivery and installation of the hardware. In such a case, if operation of the feature is requested before the additional hardware is installed, step 112 (FIG. 3-B) preferably takes the form of displaying a notice like the following:

"The requested feature has been activated, but the [hardware item] required for operation of the feature has not been installed in your system. The [hardware item] was automatically ordered on [date] when you requested activation and is expected to be delivered on [date]. If you have a question about this, please contact your sales representative at . . . ."

It will be understood that at least some of the data required to generate the notice may be stored in the activation map.

Figure 5:
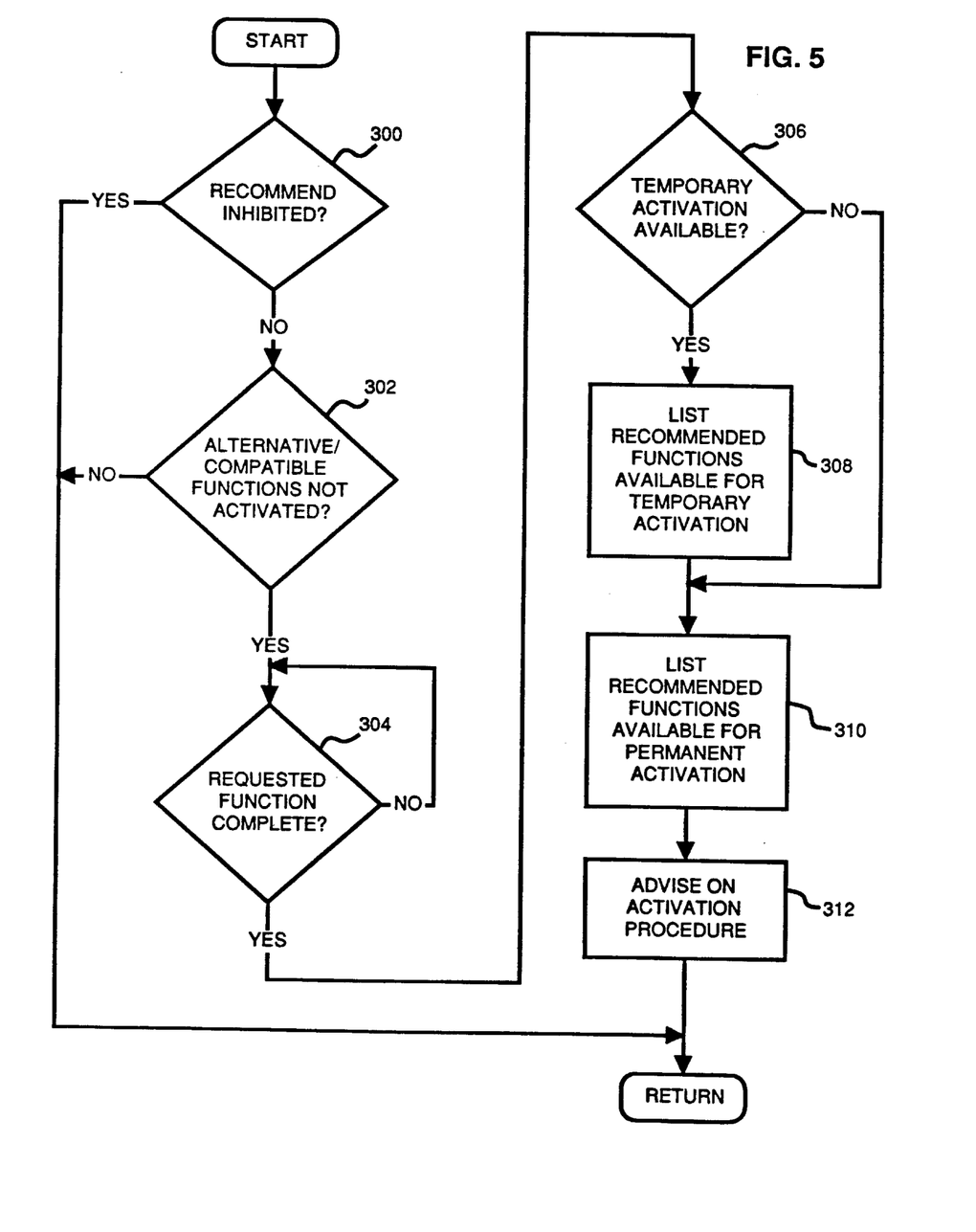
FIG. 5 is a flow chart of a routine whereby the device of FIG. 1 recommends activation of unactivated optional features.

Referring now to FIG. 5, there will be discussed operation of application guide submodule 70 of program activation module 58. Operation of application guide 70 is initiated upon execution of an application or a feature for which there are alternative or compatible applications or features resident among the application program stored in device 20. For example, a duplicate address elimination feature of addressing application 46 would be compatible with a mailing list merger feature of the same application. As another example, a postal charge back report feature of accounting application 44 would be compatible with a department-by-department accounting feature of the same application.

Assuming that a feature or application having a compatible or alternative feature or application is run, the routine of FIG. 5 begins with step 300, at which it is determined whether application guide submodule 70 has been inhibited. It will be appreciated that preferably the user of the system is allowed, perhaps by selection of a menu item, to inhibit operation of application guide submodule 70 to prevent that submodule from being an irritation during operation of device 20.

If at step 300 it is determined that the application guide was inhibited, the routine immediately ends. Otherwise, the routine proceeds to step 302, at which it is determined whether any alternative or compatible features or applications available in device 20 are not activated. If that is not the case, the routine ends. Otherwise, the routine proceeds to step 304, at which the routine idles until the function that prompted the application guide submodule 70 to run is complete. Upon completion of that initiating function, it is determined whether any of the alternative or compatible functions that have not been activated are available for temporary activation (step 306). If so, there is displayed on display 26 a suggestion that there are one or more unactivated functions available on device 20 and a listing, and preferably also a description of the advantages, of those functions. After step 308 (or immediately following step 306 if there are no compatible functions for which temporary activation is available) is step 310, at which there is displayed on display 26 information concerning unactivated compatible alternative functions that are available for permanent activation. As one example, one may assume that the application guide submodule was initiated by operation of a mailing list merge feature. If a duplicate address elimination feature is resident in device 20 but not activated, information such as the following would be displayed on the display 26:

"A software program exists in your system that eliminates duplicate addresses. That program has not been activated. In the present merge you had N duplicate addresses. If the duplicate address elimination feature had been activated, this would not have occurred."

Next following step 310, is step 312, at which there would be displayed information advising the user as to how to request activation. As a result, the user may well choose to take steps that would lead to the carrying out of the routines illustrated in FIGS. 3-A, 3-B, 3-C 3-D, 4-A and 4-B.

While the invention has been disclosed and described with reference to a limited number of embodiments and approaches it is apparent that variations and modifications may be made therein and it is therefore intended in the following claims to cover each such variation and modification as falls within the true spirit and scope of the invention.

As used in the following claims, "memory means" shall be understood to include all memory devices operatively connected to a microprocessor referred to in a respective claim.

What is claimed is:

1. A method of activating an optional feature in a data processing device to enable said data processing device to access said optional feature for execution by said data processing device, said optional feature being stored in said data processing device, said method comprising the steps of:
   a) receiving a request to activate said optional feature;
   b) in response to said activation request generating an activation request code, said activation request code including information which identifies said data processing device and said optional feature;
   c) transmitting said activation request code to a data center; said data center responding to receipt of said activation request code to generate an activation code, said activation code identifying said optional feature; and
   d) inputting said activation code to said data processing device, said data processing device responding to said activation code to enable access to said optional feature; whereby,
   e) activation of said optional feature occurs under control of said data center; and,
   f) the further step of automatically ordering additional necessary hardware for said data processing device if activation of said optional feature in said data processing device requires said additional necessary hardware; and,
   g) wherein said optional feature is software for carrying out a function of said device and said software is comprised in an application program stored in said data processing device; and,
   h) wherein said data processing device includes a display and said method includes a further step of, upon activation or execution of said optional feature, displaying a prompt to an operator of said data processing device advising said operator of other optional features alternative or complementary to said optional feature for which activation may be requested.

2. A method of activating an optional feature in a data processing device to enable said data processing device to access said optional feature for execution by said data processing device, said optional feature being stored in said data processing device, said method comprising the steps of:
   a) receiving a request to activate said optional feature;
   b) in response to said activation request generating an activation request code, said activation request code including information which identifies said data processing device and said optional feature;
   c) transmitting said activation request code to a data center; said data center responding to receipt of said activation request code to generate an activation code, said activation code identifying said optional feature; and
   d) inputting said activation code to said data processing device, said data processing device responding to said activation code to enable access to said optional feature; whereby,
   e) activation of said optional feature occurs under control of said data center; and,
   f) and the further step of automatically ordering additional necessary hardware for said data processing device if activation of said optional feature in said data processing device requires said additional necessary hardware.

3. A method as described in claim 2 wherein said optional feature is software for carrying out a function of said device and said software is comprised in an application program stored in said data processing device.

4. A method as described in claim 3 wherein said optional feature is activated for a temporary period; said activation code specifying said temporary period and said data processing device responding to said activation code to activate said optional feature for said temporary period.

5. A method as described in claim 4 wherein said temporary period is a fixed time period.

6. A method as described in claim 4 wherein said temporary period is specified as a quantity of usage of said optional feature.

7. A method as described in claim 2 wherein said optional feature is a data table of rate data for a particular class of goods or services, said data processing device is for calculating costs of goods or services; and said rate table is activated to enable said data processing device to calculate costs for goods or services selected from said particular class.

8. A method as described in claim 7 wherein said rate data relates to costs of shipping goods via a particular class of service provided by a particular carrier.

9. A method as described in claim 8, wherein said rate table is a discount rate table.

10. A method as described in claim 8, wherein said rate table is an alternative new rate table.

11. A method as described in claim 8 wherein said rate table is activated for a temporary period.

12. A method as described in claim 11 wherein said temporary period is specified as a quantity of usage of said rate table.

13. A method as described in claim 8 wherein said temporary period is a fixed time period.

\* \* \* \* \*